United States Patent [19]

Cadee

[11] 4,400,164
[45] Aug. 23, 1983

[54] METHOD AND APPARATUS FOR CONTROLLING AN INFINITELY VARIABLE TRANSMISSION

[75] Inventor: Theodorus P. M. Cadee, Goirle, Netherlands

[73] Assignee: Van Doorne's Transmissie B.V., Tilburg, Netherlands

[21] Appl. No.: 197,682

[22] Filed: Oct. 16, 1980

[30] Foreign Application Priority Data

Oct. 19, 1979 [NL] Netherlands .................. 7907714

[51] Int. Cl.³ .................. F16H 11/06; B60K 41/12
[52] U.S. Cl. .................. 474/12; 474/18; 74/867
[58] Field of Search .................. 74/713, 863, 867, 870, 74/843, 856, 868, 864; 474/18, 25, 11, 12

[56] References Cited

U.S. PATENT DOCUMENTS

| 3,043,152 | 7/1962 | Karig et al. | 474/18 |
| 4,152,947 | 5/1979 | van Deursen et al. | 474/28 |
| 4,161,894 | 7/1979 | Giacosa | 474/28 |

FOREIGN PATENT DOCUMENTS 2752322 11/1976 Fed. Rep. of Germany ........ 474/18

*Primary Examiner*—Lawrence J. Staab
*Assistant Examiner*—Andrew Joseph Rudy
*Attorney, Agent, or Firm*—Cushman, Darby & Cushman

[57] ABSTRACT

A method and apparatus for controlling the transmission ratio of a two-pulley type of infinitely variable V-belt transmission wherein the diameter of the driving pulley is adjusted in partial response to the fluid pressure in a hydraulic cylinder which controls the diameter of the driven pulley.

4 Claims, 2 Drawing Figures 4,400,164

METHOD AND APPARATUS FOR CONTROLLING AN INFINITELY VARIABLE TRANSMISSION

The invention relates to a method and apparatus for controlling the transmission ratio of an infinitely variable V-belt transmission provided with a primary (input) pulley and a secondary (output) pulley. The pulleys have conical sheaves which are mutually displaceable axially by means of a primary and a secondary hydraulic cylinder, respectively, so that the effective diameters of the pulleys, and hence the transmission ratio, can be changed.

BACKGROUND

U.S. Pat. No. 4,152,947 discloses transmission control method wherein the transmission ratio of the transmission is set or adjusted by means of a hydraulic valve having an internal pilot spool or pilot sleeve which on one end is loaded or biased by a fluid pressure supplied by means of the Pitot tube in dependence on the input rotational speed, i.e. in proportion to the input rotation speed. On the other end the pilot sleeve is loaded or biased by a spring which is compressed in dependence on (proportional to) an external control signal such as, in case of a motor vehicle transmission, the inlet manifold pressure or the position of throttle pedal or throttle valve. To achieve this function a control member compressing the spring is connected for instance to a vacuum-operated cylinder or via a cam to the throttle pedal or throttle valve.

In the above known method the transmission ratio of the transmission is always set or adjusted in such a way that the engine speed (input speed of the transmission) assumes a given value, depending on and proportional to the external control signal, e.g. on the position of the throttle pedal, and naturally in so far this is possible within the ratio range of the transmission.

In the case of a motor vehicle, when one has to accelerate with a given acceleration, a certain motor power will be required. The transmission will then shift in such a way that the engine speed optimum for said motor power is set and this speed will be maintained during the acceleration as long as the parameters defining the required engine speed do not change. In certain cases it has been found that it is desirable that the input speed (the engine speed) depends not only on an external control signal but also in part, e.g. on a required output power and on specific conditions of the drive motor.

In a motor vehicle the drivability may be improved by a control whereby in case of acceleration (increasing vehicle speed) the engine speed increases at for the rest constant parameters.

SUMMARY OF THE INVENTION

It is the object of the invention to provide a control for an infinitely variable transmission wherein the shifting behavior can be simply improved, particularly when the transmission is used in a motor vehicle.

To this effect according to the invention the transmission ratio of the transmission is set or adjusted partly dependent on the fluid pressure in the secondary cylinder, i.e. the hydraulic cylinder associated with the secondary or output pulley.

It has been found that this secondary fluid pressure, which depends on the tension in the drive belt and the actual (i.e. set) transmission ratio, is an appropriate control signal. The tension of the drive belt will have to be sufficiently large to effect the required frictional force between the drive belt and the pulleys. On the other hand this tension in general will be set not larger than required, since a larger tension of the drive belt will result in a reduction of the efficiency. With a substantially constant input torque (torque of the drive motor, the force to be transmitted by the drive belt is directly dependent on the running diameter of the drive belt in the primary pulley, and is therefore dependent on the transmission ratio of the transmission. The tension of the drive belt will be so controlled that the tension decreases when changing to a higher gear (i.e. a lower transmission ratio), since thereby the force to be transmitted by the drive belt decreases. In practice it was found that, partly through dynamic effects, the fluid pressure in the secondary cylinder varies much more than the fluid pressure in the primary cylinder, which in the optimal condition varies only little. This secondary fluid pressure, which largely depends on the transmission ratio (also at constant fluid pressure in the primary cylinder) appears in practice a proper control signal.

With a transmission wherein the transmission ratio is controlled by a hydraulic spool valve having a spool or pilot sleeve which is loaded (biased) on the one end by a force depending on the input speed (i.e. the engine speed), and on the other end loaded (biased) by a force depending on an external control signal (e.g. the position of a control cam which in a motor vehicle may be connected to the throttle pedal according to a further feature of the invention, upon increasing fluid pressure in the secondary cylinder, the force which is dependent on (proportional to) the external control signal can be reduced.

The invention also relates to an apparatus for controlling the transmission ratio of an infinitely variable V-belt transmission, provided with a primary (input) pulley and a secondary (output) pulley, whose conical sheaves are mutually displaceable through a primary hydraulic cylinder and a secondary hydraulic cylinder, respectively, said apparatus according to the invention being characterized by means for setting or adjusting the transmission ratio partly in dependence on the fluid pressure in the secondary cylinder.

According to a further feature of the invention, in a transmission fitted with a hydraulic valve for controlling the fluid pressure to the sheave control cylinders and hence the transmission ratio, the pilot sleeve of the valve may be partly loaded in dependence on the fluid pressure in the secondary cylinder.

If the pilot sleeve is loaded on one end by a force depending on the input speed of the transmission and on the other end is loaded by a force depending on an external control signal, means may be provided according to the invention for reducing the latter force upon increasing fluid pressure in the secondary cylinder.

Thereby according to still another feature of the invention, the pilot sleeve may be provided with a coaxial piston displaceable dependent on the fluid pressure in the secondary cylinder, said piston being adapted to displace, through a piston rod, a stop one end of which rests against a spring. The other end of the stop rests against an actuation member which is displaceable in response to the external control signal.

Thereby according to a further feature of the invention, the actuation member may also rest against a spring which directly loads the pilot sleeve. Through application of the second spring 'eristic of the force exerted on the pilot sleeve can be obtained, as will be further explained.

BRIEF DESCRIPTION OF THE DRAWINGS

Two embodiments of the control apparatus according to the invention will now be explained, by way of example, with reference to the accompanying drawings, wherein.

DETAILED DESCRIPTION

Figure 1:
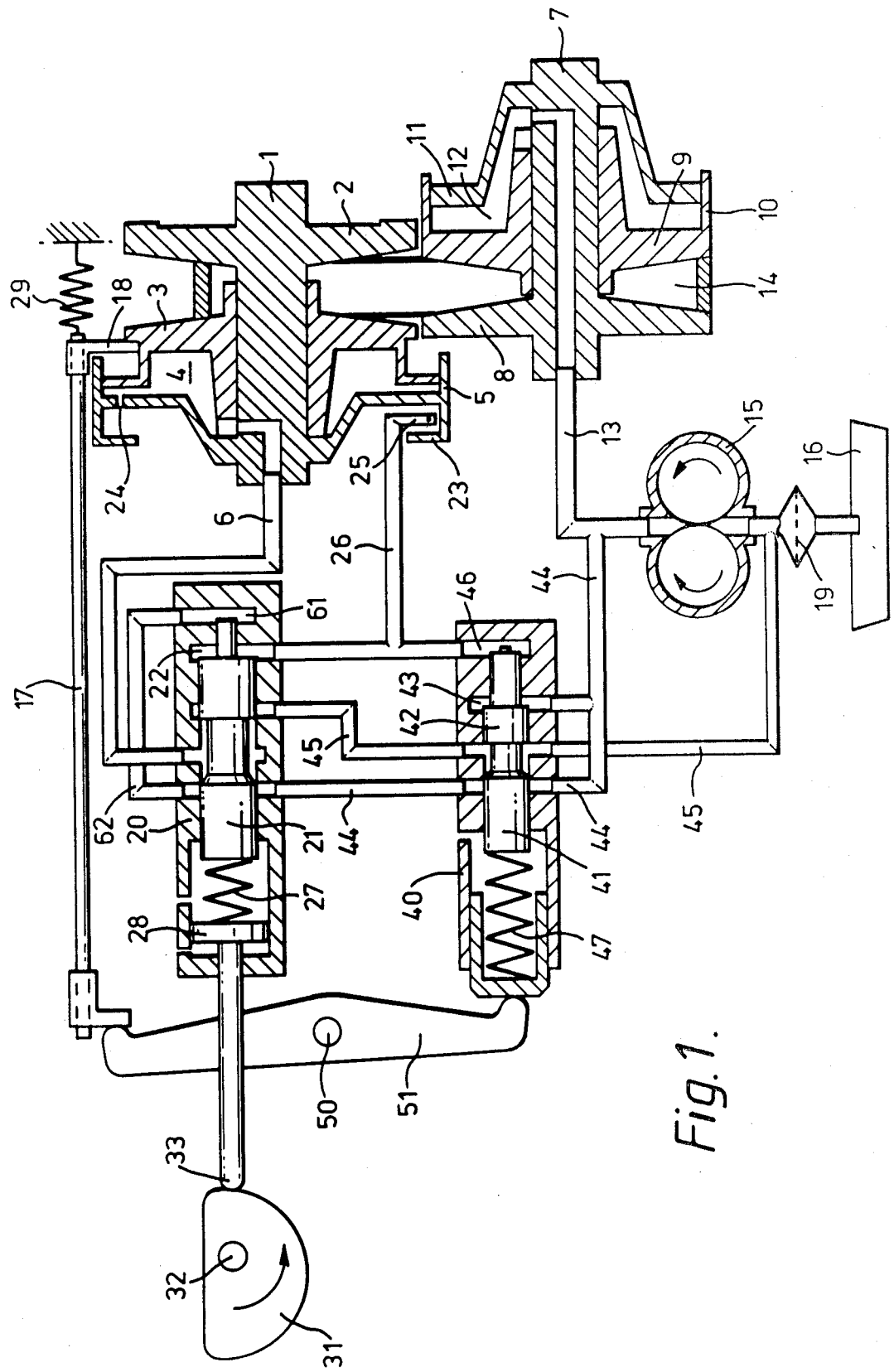
FIG. 1 is a schematic sectional view of a transmission and control system.

The system shown in FIG. 1 comprises a primary or input shaft 1, provided with a fixed conical sheave 2 and an axially movable conical sheave 3, which together form the primary or input pulley. The sheave 3 forms the piston of a primary cylinder 5 comprising a cylinder space 4 and can be axially displaced by fluid supply and discharge via a line 6. A secondary or output shaft 7 is provided, with a fixed sheave 8 and an axially movable conical sheave 9, which together constitute the secondary or output pulley. Sheave 9 is integrally connected to a cylinder 10. A piston 11 is disposed in the cylinder 10 and is fixedly connected to the secondary shaft 7. A cylinder space 12 is enclosed between the cylinder 10 and the piston 11. Pressure fluid can be supplied to and discharged from the cylinder space 12 via a line 13.

Looped over the primary and secondary pulleys is a V-shaped drive belt 14. This may be, e.g. a reinforced or nonreinforced synthetic drive belt or a metal drive belt. Through axial displacement of the conical sheaves 3 and 9, the running diameters of the drive belt 14 about the two pulleys can be so changed that the difference in rotation speed of shafts 1 and 7 can be varied infinitely. The fluid pressures in cylinder spaces 4 and 12 are such that the required tension force in the drive belt 14 is present.

A fluid pump is provided for drawing in and pressurizing fluid from a reservoir 16 via a filter 19.

For sensing the actual transmission ratio, there is provided a rod 17 which through a sensing shoe 18, rests against the axially displaceable sheave 3, under the influence of a compression spring 29. Depending on the transmission ratio, the rod 17 is displaced in axial direction.

There is provided an overflow valve 40 for controlling the fluid pressure pressurized by the pump 15, which fluid pressure is also present in the hydraulic space 12. The valve 40 is fitted with an axially movable spool or sleeve 41. Since the sleeve 41 is provided with an enlarged portion 42, which is in contact with the fluid in space 43 supplied by the pump 15, the sleeve 41, upon increasing pumping pressure, will be displaced to the left (in the figure). In case of sufficient displacement of the sleeve 41, the fluid in a line 44 may flow back via line 45 to the low pressure side of the pump 15.

The sleeve 41 which thus controls the pressure of the fluid pressurized by the pump 15, is also influenced by the input speed of the shaft 1. For sensing this speed, there is disposed on the cylinder 5 a radially outwardly closed annular groove 23 which, via an opening 24, is filled with fluid from the cylinder space 4. The filling may also be effected from the outside via a separate fluid supply line. By means of a Pitot tube 25, the fluid in the groove 23 rotating with the primary shaft 1 is converted into a fluid pressure, which via a line 26 is passed to the space 46, wherein the fluid pressure is therefore dependent on the speed of the primary shaft 1. On the other end, the sleeve 41 is loaded by the compression of a spring 47, which is compressed in response to the actual transmission ratio by means of a lever 51 rotating about axis 50. One end of the lever 51 bears against the spring 47 and the other end of the lever 51 bears against an end of the rod 17. It will be clear that in this manner the tensioning force in the drive belt 14 is controlled through the fluid pressure in the cylinder space 12, viz, depending on input speed and transmission ratio. Upon increasing transmission ratio (i.e. changing to lower gear) the pressure in the cylinder space 12 will increase which is desired in connection with the required tension in the drive belt. This hydraulic control principle is further described in U.S. Pat. No. 4,152,947.

The transmission ratio of the infinitely variable transmission is controlled through a transmission control valve 20 provided with an axially displaceable spool or pilot sleeve 21. The pilot sleeve 21 is loaded (biased) on one end by the fluid pressure in a space 22, which fluid pressure depends on the primary or input speed of the shaft 1, and by the fluid pressure in a space 61 which is in communication via lines 62, 44 and 13 with the secondary cylinder 12.

On the other end the pilot sleeve 21 is loaded by the compression force of a spring 27, which is compressed through an actuation member 28. The member 28 is carried at one end of a cam follower 33 the other end of which rests against a cam 31. Rotation of the cam 31 about an axis 32 results in linear movement of the cam follower 33. The control of the transmission ratio is effected as follows. As long as the transmission is in a given transmission ratio (i.e. not the lowest or the highest transmission ratio whereby one of the axially displaceable sheaves 3 or 9 rests against a stop), the pilot sleeve 21 is in an equilibrium situation wherein no fluid is discharged or supplied from or toward cylinder space 4. In this state of equilibrium of pilot sleeve 21, shown in FIG. 1, the force of the spring 27 is equal to the forces exerted on the pilot sleeve 21 by the fluid in the space 22 and in the space 61. The force of the spring 27 (i.e. the rotation position of the cam 31) consequently corresponds to a given combination of input speed (i.e. fluid pressure in space 22) and fluid pressure in the secondary cylinder space 12 (this is the fluid pressure in space 61).

When at constant position of the cam 31 (i.e. a constant external control signal) the output speed (rotation speed of the shaft 7) increases, the transmission will shift to a lower transmission ratio (i.e. a higher gear), since a proportional rise of the input speed (of shaft 1) results in an increased fluid pressure in the space 22. This causes the pilot sleeve 21 to be displaced to the left, so that via lines 44 and 6 fluid is conducted to the cylinder space 4. This shifting continues until the equilibrium of the pilot sleeve 21 is restored. During this shifting, however, the fluid pressure in the cylinder space 12 is changed because the rod 17 displaces axially thereby influencing valve 40, and as a result there prevails in the space 61 a lower fluid pressure if the transmission ratio is lower (i.e. a change into a higher gear has taken place). This reduction of the fluid pressure in the space 61 is compensated by an increased fluid pressure in space 22 which has to be effected by an increased input speed.

In the control shown in FIG. 1, consequently the input speed of the transmission will be determined by the position of the cam 31, however, with a correction depending on the fluid pressure in the secondary cylinder space 12. This correction slightly increases the input speed upon increase of the output speed. This correction takes place at each position of cam 31.

Figure 2:
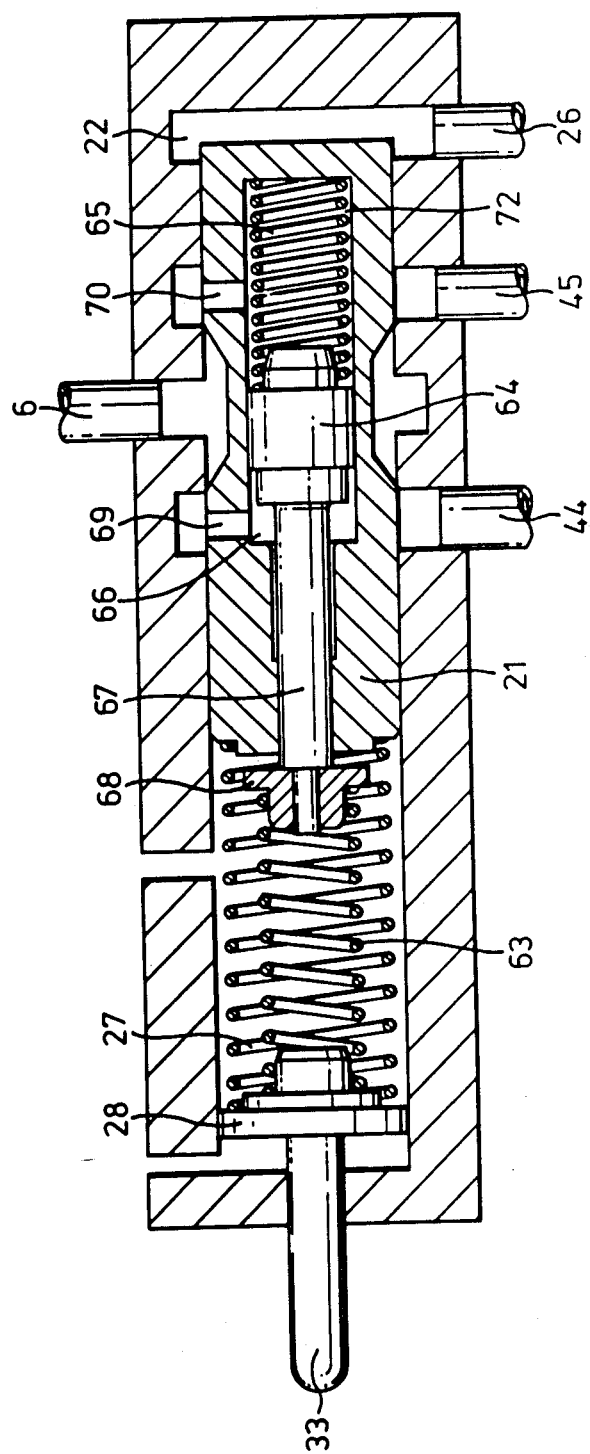
FIG. 2 is a sectional view of a second embodiment of a hydraulic control valve.

FIG. 2 shows a second embodiment of a transmission control valve wherein the same reference numerals are used to designate elements which are the same as in the valve 20 of FIG. 1. An internal pilot sleeve 21 is loaded on one end by an actuation member 28 and on the other end by the fluid pressure in a space 22, which pressure depends on the input speed of the transmission. Depending on the position of the pilot sleeve 21, fluid is passed via lines 44 and 6 to the primary cylinder space 4 or via lines 6 and 45 discharged from the primary cylinder space 4. In the equilibrium condition, the forces exerted jointly by springs 27 and 63 on the pilot sleeve 21 are equal to the force exerted by the fluid pressure in the space 22 on the pilot sleeve 21. The input speed of the transmission (i.e. the fluid pressure in the space 22) consequently is determined by the force of the springs 27 and 63. This force is substantially defined by the position of the actuation member 28 (i.e. an external control signal), however, corrected by the position of a piston 64, which is mounted coaxially in pilot sleeve 21. The piston 64 is loaded on one end by a compression spring 65 and on the other end by the fluid pressure in the space 66, which via lines 69 and 44 is in communication with the secondary cylinder space 12 (compare FIG. 1). The piston 64 is connected through a piston rod 67 to a stop 68 against which the spring 63 rests.

Upon increasing fluid pressure in the secondary cylinder space 12 and hence in the space 66, the piston 64 will be displaced relatively to the right, so that the compression force of the spring 63 decreases. The influence of the position of actuation member 28 on the pilot sleeve 21 is thereby corrected in dependence of the fluid pressure in the secondary cylinder space 12, similarly as explained in respect of FIG. 1.

Through the use of two springs 27 and 63, of which only one is influenced by the fluid pressure in the secondary cylinder space 12, the possibilities are increased to effect a desired relation between the position of the actuation member 28 and the force exerted on the pilot sleeve 21. It is then possible, in case of a low input speed, whereby actuation member 28 is in the extreme left position, to eliminate the influence of the spring 63 by limiting the maximum length thereof. As a result, a fixed minimal input speed over the entire range of transmission ratios can be set, which may be important for utilizing a given, minimally allowable speed of the drive motor over the entire range of transmission ratios.

When the transmission is employed in a motor vehicle, a control of the transmission ratio can thus be achieved, whereby, upon a low acceleration, a fixed low engine speed is set, but upon a greater acceleration, at a higher engine speed, the engine speed increases upon increasing vehicle speed.

FIG. 2 shows a line 70 which connects the space 72, wherein spring 65 is accommodated, to the line 45, so that in the space 72 there always prevails a low fluid pressure. It is also possible to connect the space 72 to the space 22, so that in the space 72 there prevails a pressure that depends on the input speed of the transmission. This may have a favorable effect on the control behavior, since the correcting effect of the piston 64 is increased. As appears from the above, the input speed (engine speed) is increased by displacement of piston 64 to the left as a result of a pressure reduction in space 66. This increase of the input speed results in an increased fluid pressure in space 22. Through connection of spaces 22 and 72, the pressure increase will also prevail in the space 72, which results in a further displacement of the piston 64 to the left and hence a further increase of the input speed of the transmission.

What is claimed is:

1. Apparatus for controlling the transmission ratio of an infinitely variable V-belt transmission of the kind having a primary input pulley and a secondary output pulley, said pulleys having conical sheaves which are mutually axially displaceable by means of a primary hydraulic cylinder and a secondary hydraulic cylinder, respectively, said apparatus comprising a hydraulic valve to regulate fluid supply and discharge from and to the primary hydraulic cylinder for controlling the transmission ratio, said hydraulic valve having a valve body being loaded by a force depending on the speed of the primary pulley and by a force depending on an external signal, said hydraulic valve comprising additional means for loading the valve body dependent on the fluid pressure in the secondary cylinder.

2. Apparatus according to claim 1, wherein said additional means comprises a piston coaxially fitted in said valve body, said piston being loaded by the fluid pressure in the secondary hydraulic cylinder, said piston being adapted to displace a stop through a piston rod, said stop resting against a spring which on the other end rests against an actuation member which is displaceable by the external signal.

3. Apparatus according to claim 2, wherein the actuation member likewise rests against a second spring which directly loads the valve body.

4. Apparatus for controlling the transmission ratio of an infinitely variable V-belt transmission of the kind having a primary input pulley and a secondary output pulley, said pulleys having conical sheaves which are mutually axially displaceable by means of a primary hydraulic cylinder and a secondary hydraulic cylinder, respectively, said apparatus comprising a hydraulic spool valve having ports for communicating with the primary and secondary cylinders, respectively, and having an axially displaceable spool within the casing; means responsive to the speed of the primary pulley for supplying fluid pressure to said valve in a mode to apply an axial force, proportional to the primary pulley speed, to said spool in a first direction; and means responsive to an external signal to apply an axial force to said spool, proportional to the external signal, in an opposite direction, the arrangement being such that in an equilibrium position of the spool the force proportional to the external signal is equal to the sum of the force proportional to the speed of the primary pulley and the force proportional to the pressure in the secondary cylinder.

* * * * *